United States Patent
Miki

(10) Patent No.: US 8,028,601 B2
(45) Date of Patent: Oct. 4, 2011

(54) BICYCLE SHIFT OPERATING DEVICE

(75) Inventor: Yoshimitsu Miki, Sakai (JP)

(73) Assignee: Shimano Inc., Osaka (JP)

( * ) Notice: Subject to any disclaimer, the term of this patent is extended or adjusted under 35 U.S.C. 154(b) by 1256 days.

(21) Appl. No.: 11/678,760

(22) Filed: Feb. 26, 2007

(65) Prior Publication Data

US 2008/0202277 A1    Aug. 28, 2008

(51) Int. Cl.
*F16C 1/10*        (2006.01)
*G05G 1/08*        (2006.01)

(52) U.S. Cl. ............ 74/502.2; 74/489; 74/501.6; 74/506

(58) Field of Classification Search ................ 74/502.2, 74/501.6, 489, 506, 512, 523; 280/304.1; 188/196 BA; 474/17
See application file for complete search history.

(56) References Cited

U.S. PATENT DOCUMENTS

| 3,972,244 | A | * | 8/1976 | Bieser et al. | 474/17 |
| 4,066,154 | A | * | 1/1978 | Ross | 188/196 BA |
| 5,102,372 | A | | 4/1992 | Patterson et al. | |
| 5,448,928 | A | * | 9/1995 | Harger | 74/523 |
| 5,479,776 | A | * | 1/1996 | Romano | 74/502.2 |
| 5,590,564 | A | | 1/1997 | Kishimoto | |
| 5,758,546 | A | * | 6/1998 | Taomo et al. | 74/501.6 |
| 5,832,784 | A | * | 11/1998 | McCallips et al. | 74/512 |
| 6,397,700 | B1 | | 6/2002 | Liu et al. | |
| 6,718,844 | B2 | * | 4/2004 | Hanatani | 74/502.2 |
| 7,252,300 | B2 | * | 8/2007 | Hargroder | 280/304.1 |
| 7,841,258 | B2 | * | 11/2010 | Cesur et al. | 74/501.6 |
| 2007/0137388 | A1 | * | 6/2007 | Dal Pra | 74/502.2 |

FOREIGN PATENT DOCUMENTS

| DE | 3136922 | * | 3/1983 |
| EP | 0 700 827 A2 | | 3/1996 |
| EP | 1 564 131 A1 | | 8/2005 |
| EP | 1 746 022 A2 | | 1/2007 |

OTHER PUBLICATIONS

Webster's New World Dictionary of the American Language, 1966, p. 1031.*

* cited by examiner

*Primary Examiner* — Vinh T. Luong
(74) *Attorney, Agent, or Firm* — Global IP Counselors, LLP

(57) ABSTRACT

A bicycle shift operating device is provided with a support structure, a take-up unit and a shift positioning mechanism. The support structure has an inner wire fixing part. The take-up unit includes a rotating body mounted on the support structure to rotate about a first axis, and an inner wire routing pulley mounted on the rotating body to move with the rotating body about the first axis and to rotate independently of the rotating body about a second axis that is offset from the first axis of the rotating body. The shift positioning mechanism is operatively coupled to the take-up unit to selectively hold the take-up unit in one of a plurality of shift positions.

7 Claims, 6 Drawing Sheets

BICYCLE SHIFT OPERATING DEVICE

BACKGROUND OF THE INVENTION

1. Field of the Invention

This invention generally relates to bicycle shift operating device. More specifically, the present invention relates to a bicycle shift operating device with an increased cable stroke relative to the amount of actuation of the operating member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle transmission system.

The bicycle transmission system typically includes front and rear shift operating devices that operate front and rear derailleurs to laterally shift a chain between front and rear sprockets, respectively. The front and rear sprockets are usually coupled to the front crank and the rear wheel, respectively, such that the pedaling force from the rider is transferred to the rear wheel via the chain. Depending on the position of the chain on the front and rear sprockets, a variety of gear ratios can be provided.

In the past, shift operating devices have been utilized that include one or more levers that are pivoted in order to wind and unwind an inner wire of a control cable. Alternatively, rotating hand grips have also been utilized as shift operating devices to wind and unwind the inner wire of the control cable. Two shift operating devices are typically provided on multi-speed bicycles. Typically, one shift operating devices is a front shifting mechanism, while the other shift operating devices is a rear shifting mechanism. Each shift operating device is usually connected to an inner wire of a control cable. The inner wires of the control cables extend from the front and rear one shift operating devices to the front and rear derailleurs to shift the chain over the various front and rear sprockets, respectively. Typically, a takeup wheel or member is used to wind and unwind the inner wire about its peripheral edge. Some derailleturs require a longer cable stroke than other derailleurs. Thus, as the cable stroke of the derailleur becomes longer, then the takeup wheel becomes larger. While these prior shifting devices work well, it is desirable to make the bicycle shift operating devices relatively compact as possible. However, when the cable take up unit becomes smaller, then the amount that the operating member of the shift operating device must be moved becomes larger for the same transmission system. In other words, if the cable take up unit becomes small, then the stroke of the operating member becomes larger making it more difficult to operate.

In view of the above, it will be apparent to those skilled in the art from this disclosure that there exists a need for an improved bicycle shift operating device. This invention addresses this need in the art as well as other needs, which will become apparent to those skilled in the art from this disclosure.

SUMMARY OF THE INVENTION

One object of the present invention is to provide a bicycle shift operating device with an increased cable stroke relative to the amount of actuation of the operating member.

Another object of the present invention is to provide a bicycle shift operating device that is relatively compact simple and simple to manufacture and/or assemble.

The foregoing objects can basically be attained by providing a bicycle shift operating device that basically comprises a support structure, a take-up unit and a shift positioning mechanism. The support structure has an inner wire fixing part. The take-up unit includes a rotating body mounted on the support structure to rotate about a first axis, and an inner wire routing pulley mounted on the rotating body to move with the rotating body about the first axis and to rotate independently of the rotating body about a second axis that is offset from the first axis of the rotating body. The shift positioning mechanism is operatively coupled to the take-up unit to selectively hold the take-up unit in one of a plurality of shift positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
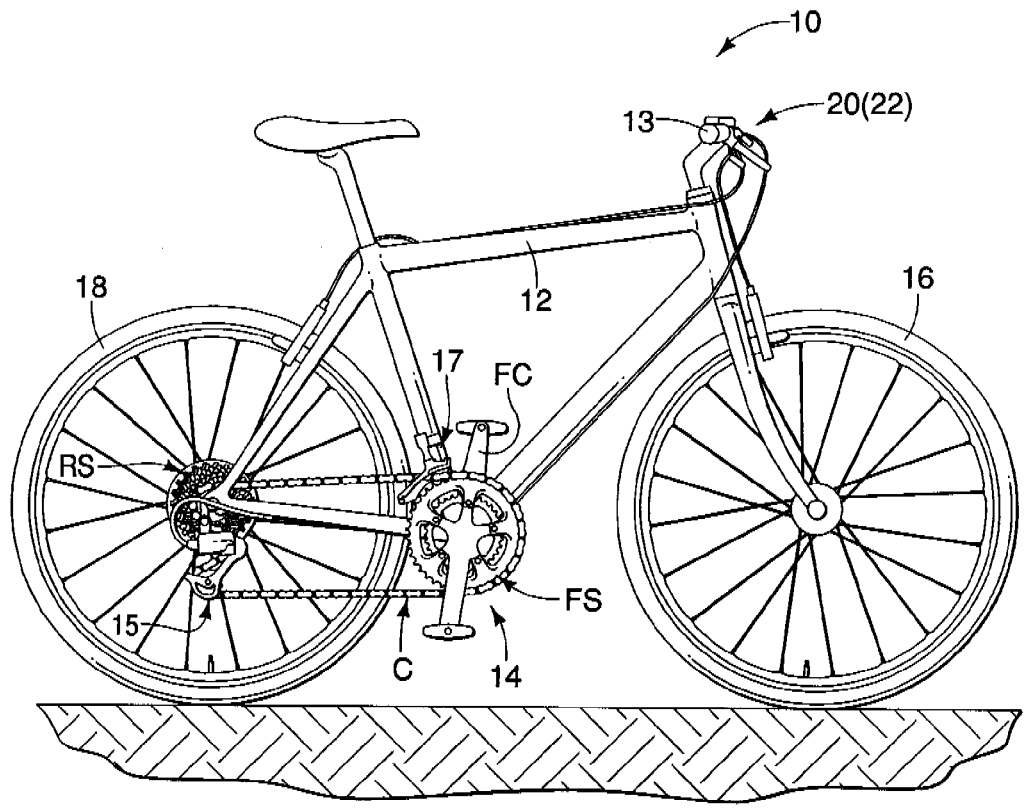
FIG. 1 is a side elevational view of a bicycle equipped with left and right hand side shift operating devices in accordance with a preferred embodiment of the present invention.
Figure 2:
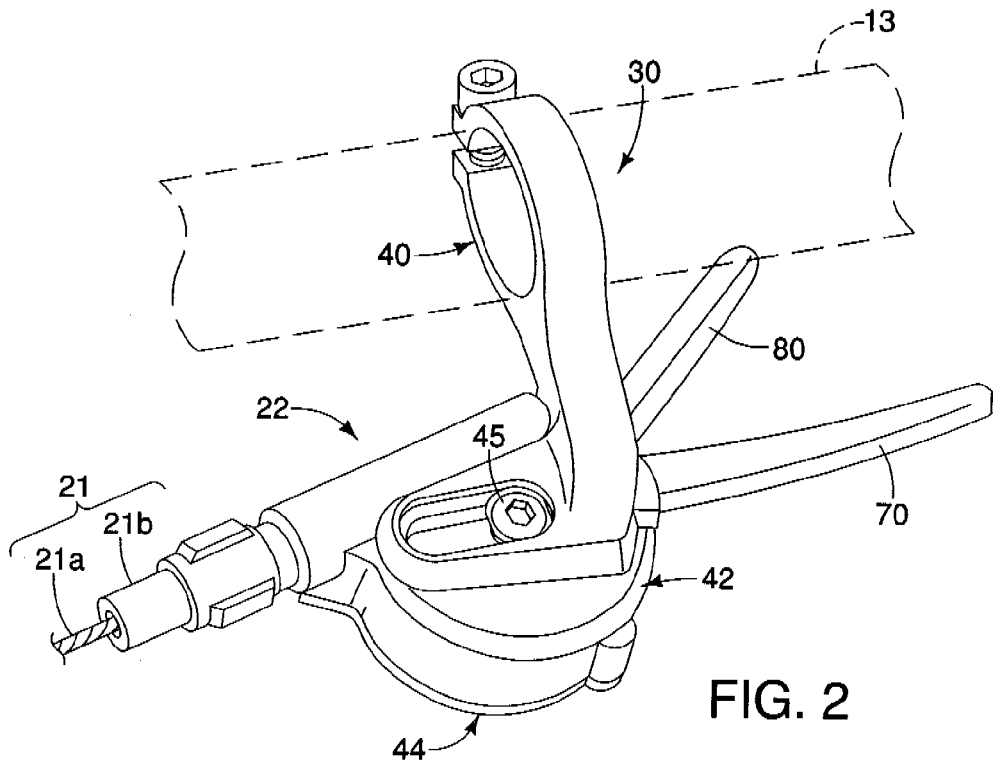
FIG. 2 is an enlarged top perspective view of the left hand side shift operating device of the bicycle illustrated in FIG. 1.

Referring initially to FIGS. 1 and 2, a bicycle 10 is illustrated that basically includes a frame 12 with a handlebar 13, a drive train or transmission 14, a front wheel 16 and a rear wheel 18. The handlebar 13 is provided with a rear or right hand shift operating device 20 (FIG. 1) mounted thereon and a front or left hand shift operating device 22 (FIG. 2) mounted thereon, with the shift operating devices 20 and 22 being configured and arranged in accordance with a preferred embodiment of the present invention as explained below. The various parts of the bicycle 10 are conventional, except for the rear and front shift operating devices 20 and 22. Thus, the remaining parts of the bicycle 10 will not be discussed or illustrated in detail herein. It will be apparent to those skilled in the bicycle art from this disclosure that various modifications can be made to the various components or parts of the bicycle 10 without departing from the scope of the present invention.

Moreover, the front (left) shift operating device 22 is substantially identical to the right (rear) shift operating device 20, except that the front shift operating device 22 is a mirror image of the rear shift operating device 20 and has fewer shifting positions. In the illustrated embodiment, each of the shift operating devices 20 and 22 is separate from the respective brake operating devices (only one shown in FIG. 1). However, it will be apparent to those skilled in the art from this disclosure that the shift operating devices 20 and 22 could be designed to have integrated brake operating devices if needed and/or desired. Moreover, while the front shift operating device 22 is position on the left side of the handlebar 13 and the rear shift operating device 20 is position on the right side of the handlebar 13, they can be reversed as needed and/or desired.

The handlebar 13 is fixedly coupled to the front fork of the frame 12 to steer the bicycle 10 via the front wheel 16. The drive train or transmission 14 includes a rear derailleur 15, a front derailleur 17, a chain C, a plurality of rear sprockets RS coupled to the rear wheel 18 and a front crank FC with a plurality of front sprockets FS coupled thereto. The rear and front derailleurs 15 and 17 are coupled to the frame 12 to move/shift the chain C laterally between the various sprockets RS and FS, respectively, in a conventional manner. The rear sprockets RS are coupled to the rear wheel 18 via a free wheel (not shown) to selectively rotate the rear wheel 18 via the chain C in order to propel the bicycle 10 in a conventional manner.

The rear and front shift operating devices 20 and 22 are operatively coupled to the rear and front derailleurs 15 and 17, respectively via a pair of shift control cable 21 in order to selectively shift the chain C laterally over the sprockets RS and FS. The rear and front shift control cables 21 are identical, except for their lengths, and are basically conventional. As seen in FIG. 2, the control cable 21 includes an inner wire 21a slidably received within an outer casing 21b.

Referring now to FIGS. 2-9, the front shift operating device 22 will now be discussed in more detail. Basically, the front shift operating device 22 includes a support structure 30, a take-up unit 32 and a shift positioning mechanism 34. The support structure 30 houses the take-up unit 32 and the shift positioning mechanism 34. The support structure 30 is also configured to be fixedly coupled to a tubular portion of the bicycle 10, such as the handlebar 13, in a conventional manner.

Figure 3:
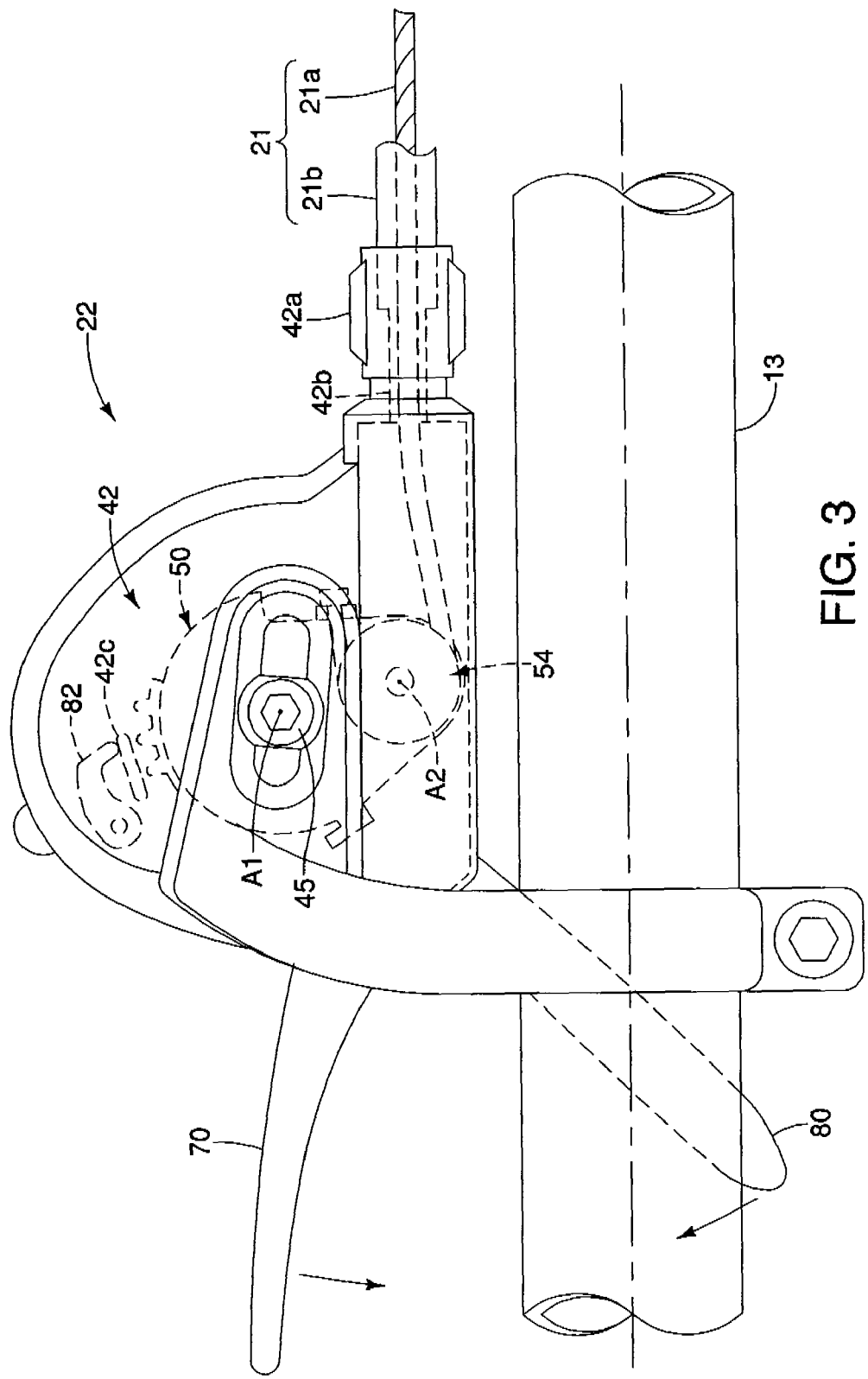
FIG. 3 is a top plan view of the left hand side shift operating device of illustrated in FIG. 2.
Figure 4:
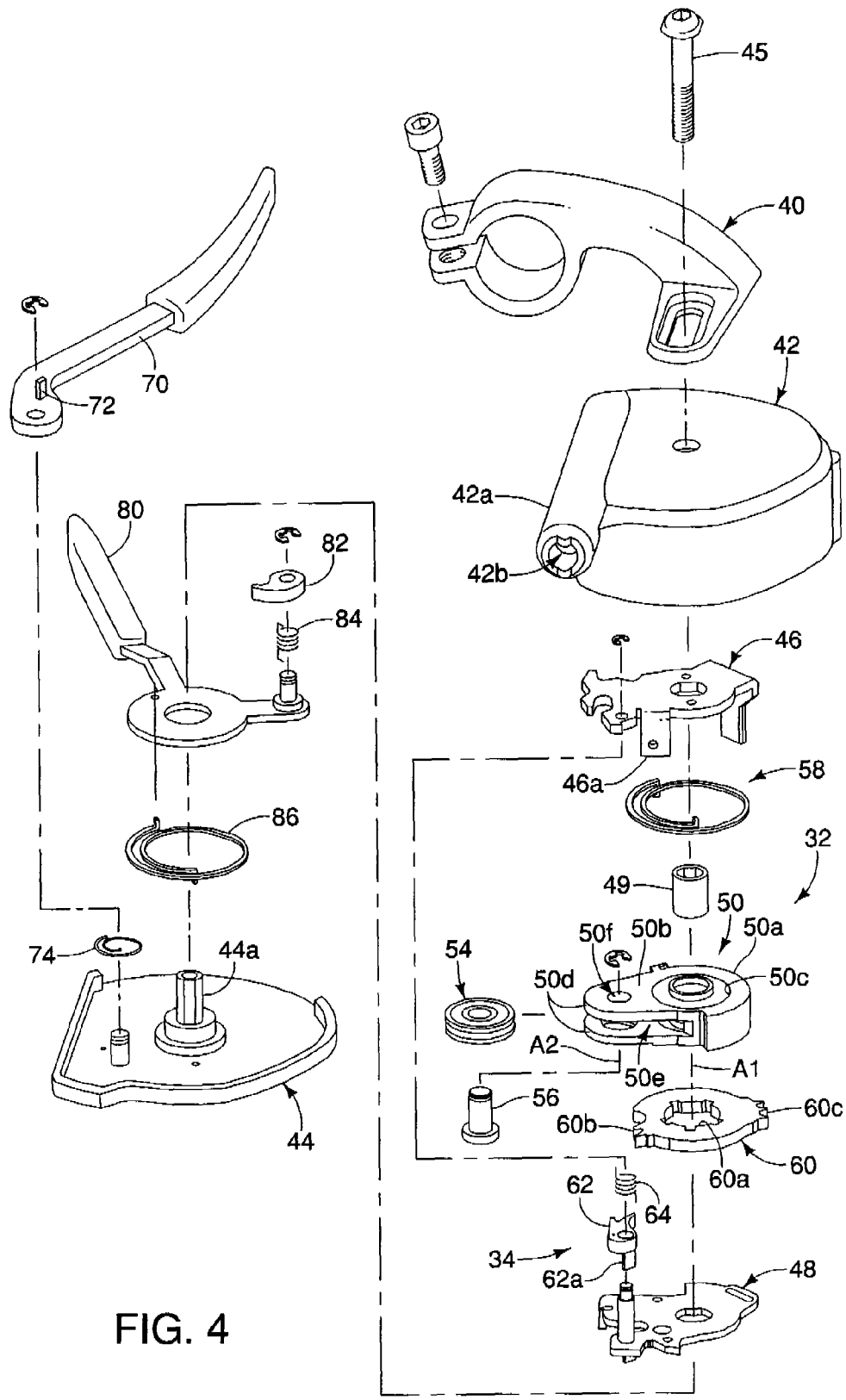
FIG. 4 is an exploded upper side perspective view of the left hand side shift operating device illustrated in FIGS. 2 and 3.

Since the precise shape and mounting arrangement of the support structure 30 can change depending on the way that the front shift operating device of the present invention is mounted, the shape and mounting arrangement of the support structure 30 will only be briefly discussed. Basically, as seen in FIG. 4, the support structure 30 has a mounting portion 40, an upper housing portion 42, a lower housing portion 44 and a fastener 45. The portions 40, 42 and 44 are constructed of rigid materials such as a hard plastic, or metal. The mounting portion 40 is configured to be clamped to the handlebar 13 in a conventional manner. The fastener 45 is a bolt that secures the portions 40, 42 and 44 together. As seen in FIG. 3, the upper housing portion 42 of the support structure 30 includes a cable engagement part 42a with a bore that forms an inner wire guide part 42b for guiding the inner wire 21a of the control cable 21. Also as seen in FIG. 3, the upper housing portion 42 of the support structure 30 also includes a tab or projection 42c. As seen in FIG. 4, the lower housing portion 44 includes a mounting axle 44a for supporting the take-up unit 32 and the shift positioning mechanism 34. The mounting axle 44a threadedly receives the fastener 45 to fixedly couple the upper and lower housing portions 42 and 44 together, and thus, operatively retain the take-up unit 32 and the shift positioning mechanism 34.

Figure 5:
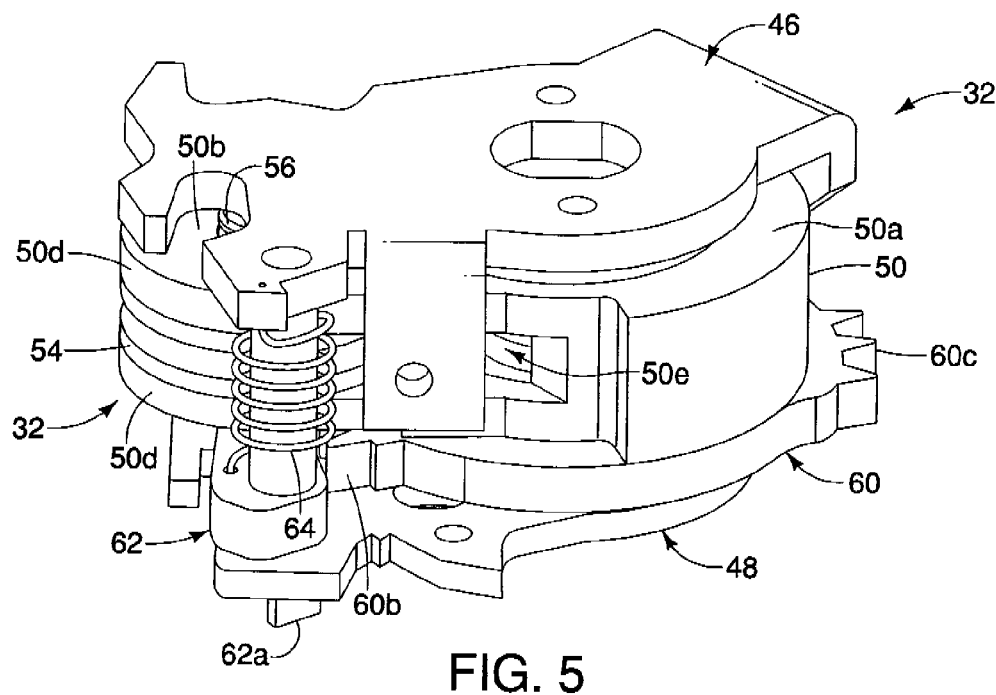
FIG. 5 is an enlarged upper side perspective view of the left hand side shift operating device illustrated in FIGS. 2-4.
Figure 6:
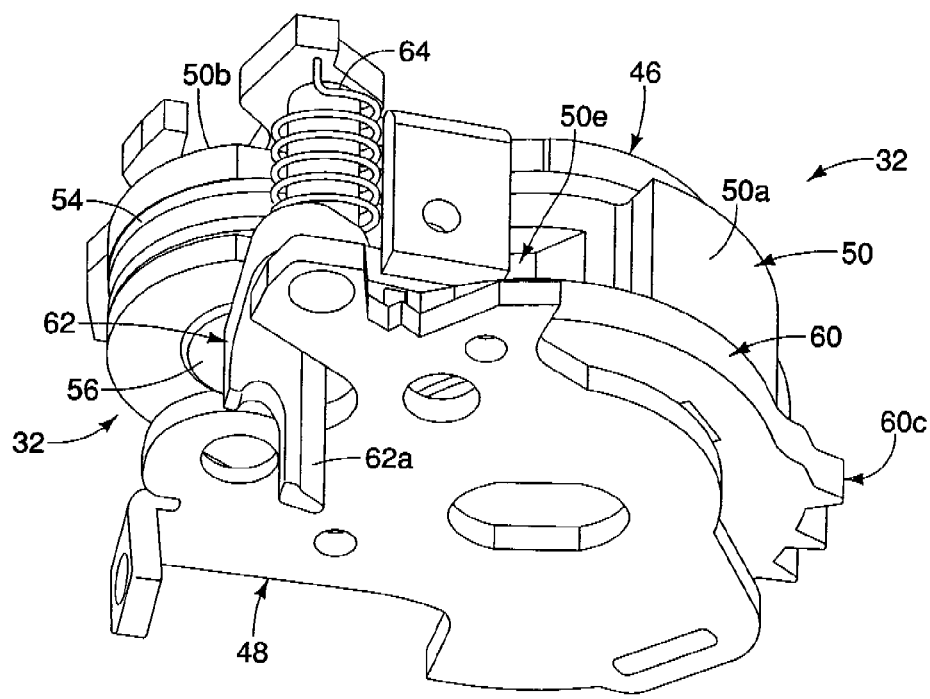
FIG. 6 is an enlarged lower side perspective view of the left hand side shift operating device illustrated in FIGS. 2-4.

As seen in FIG. 4, the support structure 30 also includes a first fixed support member 46 and a second fixed support member 48 with the take-up unit 32 rotatably mounted therebetween. The first and second fixed support members 46 and 48 are preferably metal plates that are separate members that are fixed together as seen in FIGS. 5 and 6. The first and second fixed support members 46 and 48 are non-rotatably mounted on the mounting axle 44a. A bushing 49 is non-rotatably located on the mounting axle 44a to rotatably support the take-up unit 32 between the first and second fixed support members 46 and 48.

The first fixed support member 46 of the support structure 30 includes an inner wire fixing part 46a for attaching one end of the inner wire 21a to a stationary part of the front shift operating device 22. The inner wire guide part 42b and the inner wire fixing part 46a are arranged relative to the take-up unit 32 to form a U-shaped inner wire guide path as explained below.

Figure 7:
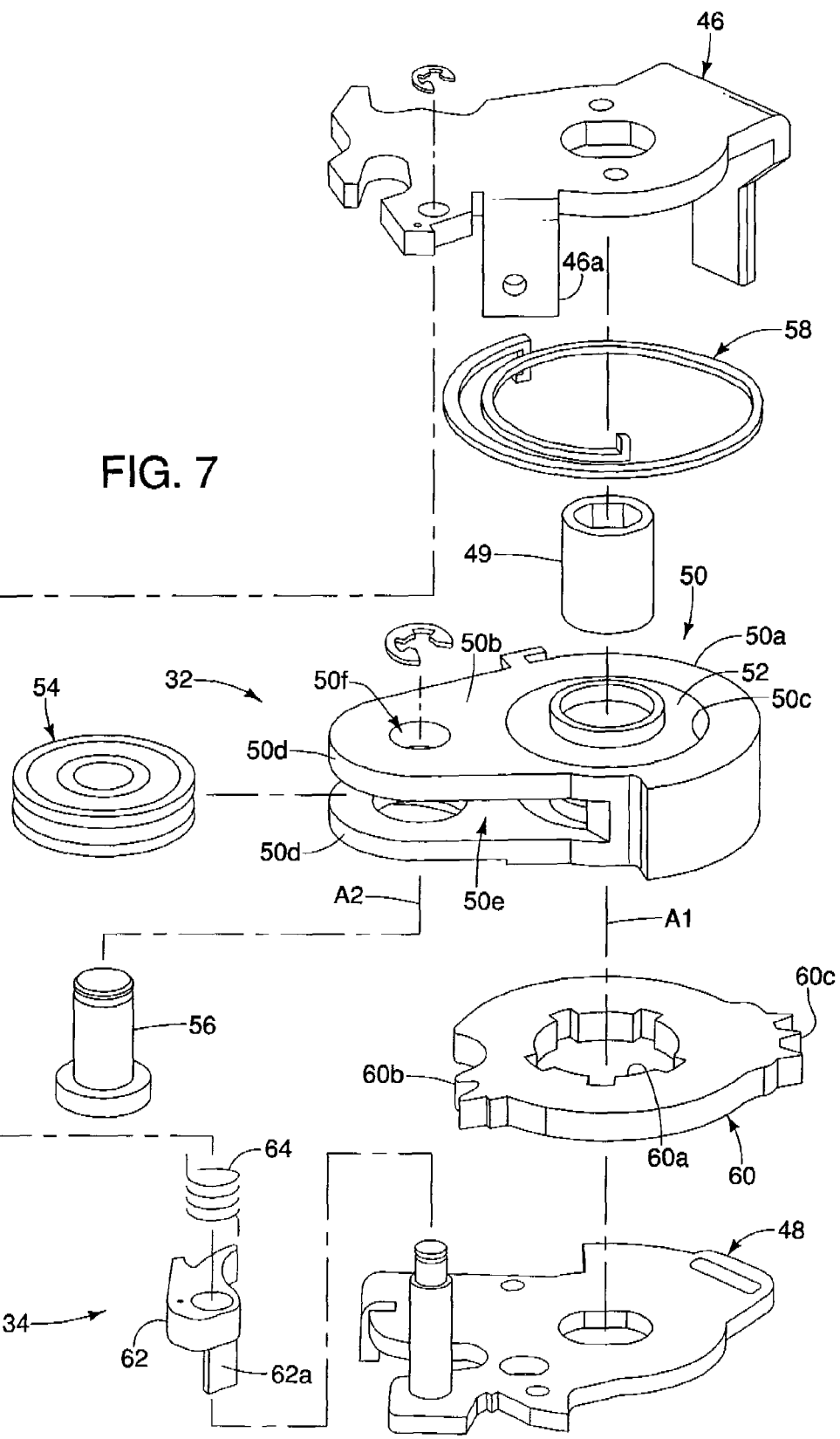
FIG. 7 is an exploded upper side perspective view of the takeup unit illustrated in FIGS. 5 and 6.
Figure 8:
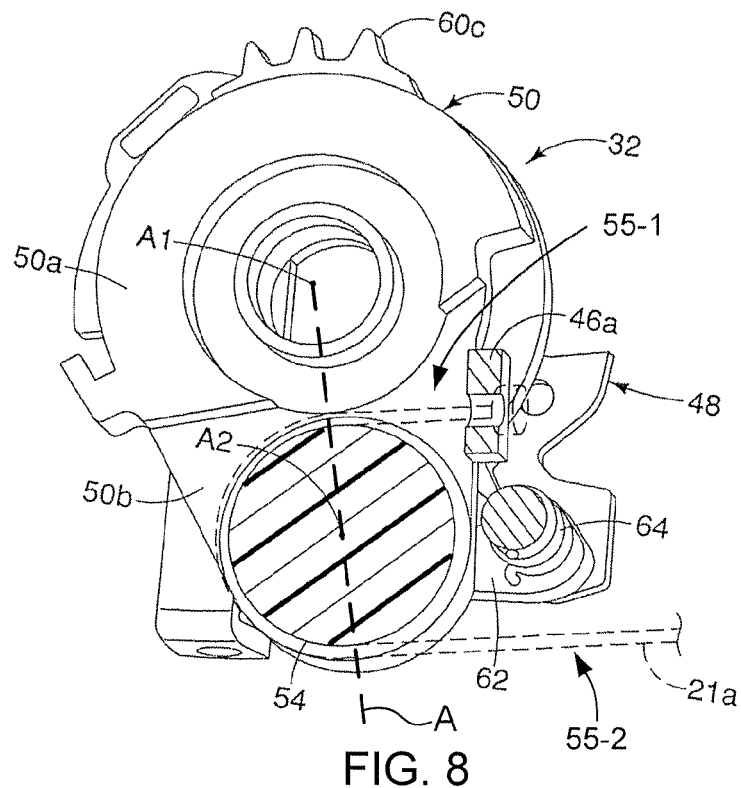
FIG. 8 is a simplified perspective view of the takeup unit illustrated in FIGS. 5 to 7 in a fully released position.
Figure 9:
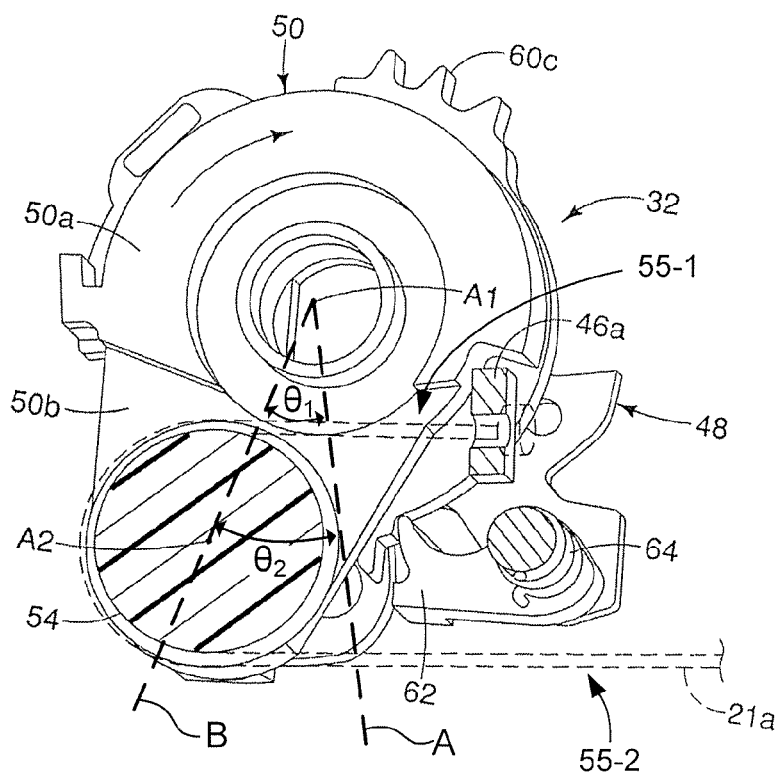
FIG. 9 is a simplified perspective view of the takeup unit illustrated in FIGS. 5 to 7 in a fully wound position.

As seen in FIGS. 4 to 9, the take-up unit 32 basically includes a rotating body 50 with a pivot mounting structure 52, an inner wire routing pulley 54 with a pivot pin 56 and a take-up biasing member 58. The rotating body 50 is pivotally mounted on the support structure 30 to rotate about a first axis A1 formed by the mounting axle 44a and the fastener 45. The rotating body 50 is biased in a release direction, i.e., the counterclockwise direction as viewed from above as illustrated in FIGS. 3 and 4. The inner wire routing pulley 54 is rotatably mounted on the rotating body 50 via the pivot pin 56. Thus, the inner wire routing pulley 54 moves with the rotating body 50 about the first axis A1. Accordingly, as shown in FIGS. 8 and 9, an angle $\theta_1$ at which the rotating body 50 rotates about the first axis A1 from position A to position B corresponds to an angle $\theta_2$ at which the second axis A2 rotates about the first axis A1 when the inner wire routing pulley 54 moves with the rotating body 50 about the first axis A1. Also as seen in FIG. 3, the inner wire routing pulley 54 rotates independently of the rotating body 50 about a second axis A2 that is offset from the first axis A1 of the rotating body 50.

Preferably, as seen in FIGS. 4 and 7, the rotating body 50 basically includes a base part 50a and a pulley support part 50b that are constructed as a one-piece, unitary member from a hard, rigid material such as a hard plastic material. The pivot mounting structure 52 is press fitted into a first pivot opening 50c in the base part 50a. Thus, the base part 50a of the rotating body 50 is rotatably supported on the support structure 30 by the fastener 45. The pulley support part 50b has a pair of parallel flanges 50d that define a slot 50e in which the inner wire routing pulley 54 is secured therein by the pivot pin 56. In other words, the pulley support part 50b of the rotating body 50 rotatably supports the inner wire routing pulley 54 via the pivot pin 56 that is received in a second pivot opening 50f that extends through both of the flanges 50d. The inner wire routing pulley 54 is preferably constructed as a one-piece, unitary member from a hard, rigid material such as a hard plastic material.

As seen in FIGS. 8 and 9, the inner wire guide part 42b and the inner wire fixing part 46a are arranged relative to the inner wire routing pulley 54 to form a U-shaped inner wire guide path. In particular, the inner wire fixing part 46a is positioned relative to the inner wire routing pulley 54 to define a first leg 55-1 of the U-shaped inner wire guide path, while the inner wire guide part 42b is positioned relative to the inner wire routing pulley 54 to define a second leg 55-2 of the U-shaped inner wire guide path, with the inner wire routing pulley 54 defining a base of the U-shaped inner wire guide path.

The shift positioning mechanism 34 is operatively coupled to the take-up unit 32 to selectively hold the take-up unit 32 in one of a plurality of shift positions. The shift positioning mechanism 34 basically includes a shift position control member or plate 60, a positioning pawl 62, a positioning pawl biasing element 64, a shift release assembly that selectively moves the positioning pawl 62 to release the shift position control plate 60 and a shift winding assembly that selectively winds the shift position control plate 60. The shift release assembly basically includes a shift release lever 70 with a release tab or projection 72 and a shift release lever return spring 74. The shift winding assembly basically includes a shift winding lever 80 with a winding pawl 82, a winding pawl biasing element 84 and a shift winding lever return spring 86. Since the basic constructions of the shift release assembly and the shift winding assembly are similar to those used in other shift operating devices, the shift release assembly and the shift winding assembly will not be discussed and/or illustrated in detail. Of course, there are differences between shift release assembly and the shift winding assembly of the present invention and those in conventional shift operating devices in order to implement the present invention.

The shift position control plate 60 is fixedly mounted to the bottom surface of the rotating body 50 to rotate therewith. In particular, the shift position control plate 60 includes a non-circular opening 60a that engages mating non-circular projection on the bottom surface of the rotating body 50. The peripheral edge of the shift position control plate 60 includes a plurality of positioning teeth 60b and a plurality of winding teeth 60c. The number of the positioning teeth 60b and the number of the winding teeth 60c depend upon the number of shift positions that are needed and/or desired for the particular shift operating device. In the case of the front shift operating device 22, there are three of the positioning teeth 60b and three of the winding teeth 60c to provide a low gear position, a top trim gear position and a top gear position for the front derailleur 17. In the case of the rear shift operating device 20, the number of the positioning teeth 60b and the number of the winding teeth 60c is equal to the number of rear gears or sprockets RS.

The positioning pawl 62 is arranged to selectively engage the positioning teeth 60b due to the urging force from the positioning pawl biasing element 64. Thus, the positioning pawl 62 is normally engaged with one of the positioning teeth 60b to hold the shift position control plate 60 and the rotating body 50 against rotation due to the biasing force of the take-up biasing member 58. The release lever 70 is a trigger type lever that is normally biased to a rest position by the shift release lever return spring 74. The release tab 72 of the release lever 70 is arranged to selectively engage a projection 62a of the positioning pawl 62 when the release lever 70 is pivoted from the rest position to a shift (pawl releasing) position. Thus, the release tab 72 is arranged to move the positioning pawl 62 out of engagement with the positioning teeth 60b upon movement of the release lever 70 from the rest position to the shift (pawl releasing) position.

The winding pawl 82 is normally held out of engagement from the winding teeth 60c by the tab 42c. When the winding lever 80 is pivoted from a rest position to a shift (pawl winding) position, the winding pawl 82 selectively engages one of the winding teeth 60c. Thus, the winding lever 80 is arranged to move the winding pawl 82 into engagement with the winding teeth 60c. The winding lever 80 is a trigger type lever that is normally biased to a rest position by the shift winding lever return spring 86. The winding pawl 82 is biased towards the winding teeth 60c due to the urging force from winding pawl biasing element 84.

Thus, by using the takeup unit 32 with the inner wire routing pulley 54, a small amount of movement of the rotating body 50 results in a long cable stroke in comparison to a takeup unit in which the inner wire is mound directly on the peripheral edge of the takeup wheel.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device comprising:
a support structure with an inner wire fixing part;
a take-up unit including a rotating body mounted on the support structure to rotate about a first axis, and an inner wire routing pulley mounted on the rotating body to move with the rotating body about the first axis and to rotate independently of the rotating body about a second axis that is offset from the first axis of the rotating body; and
a shift positioning mechanism operatively coupled to the take-up unit to selectively hold the take-up unit in one of a plurality of shift positions;
the rotating body including a base part rotatably supported on the support structure and a pulley support part rotatably supporting the inner wire routing pulley;
the base part having a first pivot opening and the pulley support part having a second pivot opening; and
the pulley support part having a slot with the inner wire routing pulley located therein.

2. The bicycle shift operating device according to claim 1, wherein
the support structure includes a first fixed support member and a second fixed support member with the take-up unit rotatably mounted therebetween.

3. The bicycle shift operating device according to claim 2, wherein
the first and second fixed support members are separate members that are fixed together.

4. the bicycle shift operating device according to claim 1, wherein
the second axis is at a radial distance from the first axis, such that the second axis orbitally rotates about the first axis at the radial distance while the inner wire routing pulley moves with the rotating body about the first axis.

5. A bicycle shift operating device comprising:
a support structure with an inner wire fixing part;
a take-up unit including a rotating body mounted on the support structure to rotate about a first axis, and an inner wire routing pulley mounted on the rotating body to move with the rotating body about the first axis and to rotate independently of the rotating body about a second axis that is offset from the first axis of the rotating body; and
a shift positioning mechanism operatively coupled to the take-up unit to selectively hold the take-up unit in one of a plurality of shift positions;
wherein
the support structure includes an inner wire guide part arranged relative to the inner wire fixing part and the take-up unit to form a U-shaped inner wire guide path with the inner of the U-shaped inner wire guide path, the inner wire guide part being positioned relative to the inner wire routing pulley to define a second leg of the U-shaped inner wire guide path, and the inner wire routing pulley defining a base of the U-shaped inner wire guide path.

6. The bicycle shift operating device according to claim 5, wherein
the support structure includes a housing with the inner wire guide part formed thereon.

7. A bicycle shift operating device comprising:
a support structure with an inner wire fixing part;
a take-up unit including a rotating body mounted on the support structure to rotate about a first axis, and an inner wire routing pulley mounted on the rotating body to move with the rotating body about the first axis and to rotate independently of the rotating body about a second axis that is offset from the first axis of the rotating body; and
a shift positioning mechanism operatively coupled to the take-up unit to selectively hold the take-up unit in one of a plurality of shift positions,
wherein
the shift positioning mechanism includes:
a shift position control member fixedly mounted to the rotating body to rotate therewith, the shift position control member including a plurality of positioning teeth and a plurality of winding teeth,
a positioning pawl arranged to engage the positioning teeth and a winding pawl arranged to engage the winding teeth, and
a release lever arranged to move the positioning pawl out of engagement with the positioning teeth and a winding lever arranged to move the winding pawl into engagement with the winding teeth.

* * * * *